O. W. NOTTINGHAM.
HEATER AND COOKER.
APPLICATION FILED JULY 15, 1919.
1,373,828.
Patented Apr. 5, 1921.
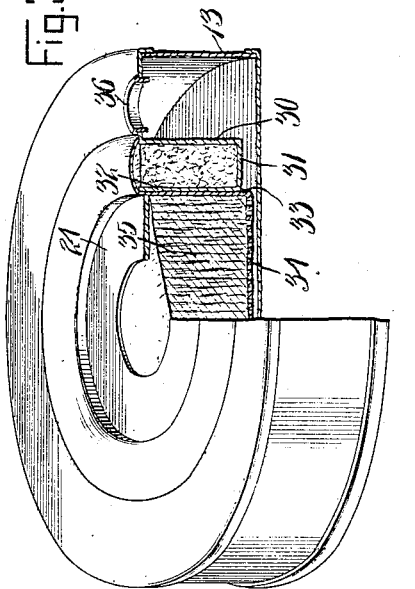
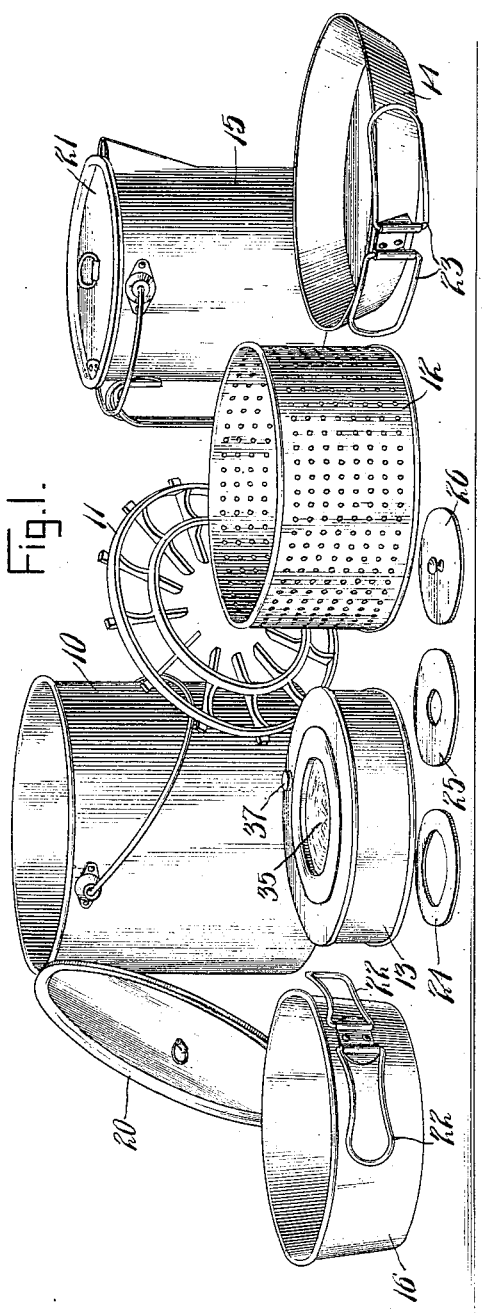
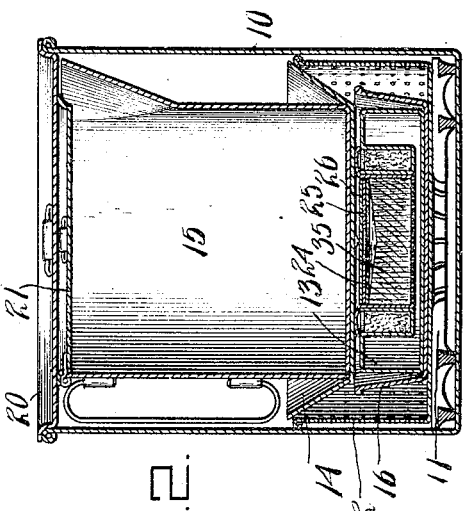
Inventor
Otis W. Nottingham.
By
Attorney

UNITED STATES PATENT OFFICE.

OTIS W. NOTTINGHAM, OF INDIANAPOLIS, INDIANA.

HEATER AND COOKER.

1,373,828.  Specification of Letters Patent.  Patented Apr. 5, 1921.

Application filed July 15, 1919. Serial No. 310,940.

*To all whom it may concern:*

Be it known that I, OTIS W. NOTTINGHAM, a citizen of the United States, residing at Indianapolis, in the county of Marion and State of Indiana, have invented certain new and useful Improvements in Heaters and Cookers, of which the following is a specification.

My present invention relates to an improved construction and arrangement of a cooking or heating outfit designed particularly for the use of automobiles and camping parties, the purpose being to provide such an outfit of a construction and arrangement that will provide for the largest possible variety of needs and at the same time one that may be packed in the smallest possible space, all as will be hereinafter more fully described and claimed.

Referring to the accompanying drawings, which are made a part hereof, and on which similar reference characters indicate similar parts, Figure 1 is a perspective view showing a group of articles comprising the entire outfit, as they they appear when separated, being thus distributed for observation, Fig. 2 is a central vertical section through the outfit when assembled, or nested together, as when packed and ready for transportation, and Fig. 3 a view partly in perspective and partly in section through the burner, showing its construction more in detail.

In said drawings the portions marked 10 represent the principal or larger receptacle, designed when the various parts are assembled, as in Fig. 2, to contain all the other parts, and to be adapted for various uses, as will be hereinafter pointed out; 11 the grate; 12 the perforated casing or support for the grate; 13 the burner; 14 a pan; 15 a heating receptacle which may be used for making coffee or other purposes, and 16 another pan.

All of these parts in themselves, with the exception of the burner, are not required to be of any special form or design, except that they shall be made of relative sizes so that they will fit or nest one within the other, as shown in Fig. 2.

The outer receptacle 10, may be used as a bucket, or pail, for bringing water from the spring, etc., or as a fireless cooker, as after dishes are properly cooked by placing them within it and closing tightly by means of a lid 20; or for storage purposes, or any other purpose for which it may be adapted.

The casing 12, is designed to contain the burner 13, and support the grate 11 above said burner, and is formed with perforated sides to admit air or oxygen to mix with the liquid fuel used in the burner and form a mixture capable of proper combustion. While I have shown this casing 12, of perforated metal, it is understood that it may be made of wire mesh or any other reticulated material desired. It is preferably of a size just to fit within the receptacle 10 and rest, when the parts are assembled, upon the grate 11, which in such instances is put into the bottom of said receptacle.

The pan 16, is designed for cooking or frying, or any other purpose for which it may be found appropriate, and when nested with the other parts, rests within the casing 12, as shown. It has handles 22, hinged thereto, and adapted to fold closely against the surface of pan under its upper edge, so as not to interfere with the nesting.

The burner 13, is formed as most clearly illustrated in Fig. 3, and contains an annular chamber between the walls 13 and 30, for containing the alcohol or other liquid fuel which may be deposited therein through an aperture 36, closed by an appropriate plug 37. Another annular chamber is formed between walls 30 and 32, the bottom 31 of which is spaced from the bottom of the burner proper in order to permit the fuel in the chamber between the walls 13 and 30 to flow underneath the same. Said last mentioned annular chamber is packed with asbestos or other similar heat non-conducting material to guard the fuel chamber from danger of explosion, resulting from excessive heat when the burner is in operation. Within the annular wall 32, is formed the burner proper, comprising an annular wall 33, with a perforated bottom 34, and a top flange 38, covering the top of the chamber between walls 30 and 32. Within the annular wall 33, is mounted a wick preferably consisting of a strip of asbestos or similar noncombustible or slow burning material, wound in helical form and packed within chamber surrounded by said wall with its upper surface a short distance below the upper edge of said wall. A series of metal rings 24 and 25, are provided to regulate the size of the blaze, and the resulting quantity of heat to the particular purpose for which the burner is to be used. While I have only shown two of these rings, it is understood of course, that as many may be employed as found desirable, the central aperture serving to regulate the size of the flame. These rings are of a size to just fit within the chamber surrounded by the wall 33, and rest upon the upper surface of the wick, or fuel absorbent material therein. A cover 26, is also provided of the same size and adapted to be placed over the rings to snuff out the blaze or fire when desired. In the operation of this burner, the fuel flows from the outer fuel chamber, under the intermediate annular chamber and through the perforations in the bottom 34, and is drawn by capillary attraction into the absorbent material so that when fire is applied to the upper surface thereof, a flame will result. A quantity of the fuel may be deposited upon the top surface of the absorbent material 35, when desired to start the fire quickly, or when fire is needed before the material is thoroughly saturated, or otherwise. The asbestos packing in the chamber between the walls 30 and 32 affords an efficient protection against danger resulting from the heat of the fire in the center of the burner. In nesting the several parts as shown in Fig. 2, this burner is placed within the receptacle 16 as shown.

The pan 14, is for such purposes as an ordinary frying pan is designed, or for any other purpose for which it may be found useful. It is provided with hinged handles 23, adapted to fold against its sides under its top edge so as not to interfere with the nesting.

The vessel 15 is intended primarily as a coffee pot, being provided with a lid 21, but may be used for a bucket or any other appropriate purpose. In nesting, this receptacle sets within the pan 14, and the parts are so designed that the top of the receptacle 15 just comes beneath the lid 20, of the main receptacle 10, and when said lid 20 is in position and fastened by a strap, or other means, all the parts within the receptacle are held steady and from any considerable movement.

By this arrangement a kit of utensils is provided which occupies very little room in an automobile or any other place, and may therefore, be easily and conveniently transported; and it likewise is of a character to afford means for cooking a large variety of things desirable for camping or outing parties. There is scarcely anything needed in the way of food but what may be cooked with this kit and after cooking kept hot for a considerable period of time by being placed within the receptacle 10 and tightly closed therein. After the fire has been extinguished from the burner 13, it may be put in the bottom of said receptacle 10 and serve as a "hot plate" to maintain the heat for a considerable period.

This and many other advantages and uses will readily suggest themselves to any one familiar with the needs of such a kit for the purposes stated and for other purposes. Such uses are so numerous and varied that they are difficult of complete enumeration, and this is not necessary in the specifications of this character, it being understood that the invention contemplates any use for which the device may be found adapted or adaptable.

Having thus fully described my said invention, what I claim as new and desire to secure by Letters Patent, is:

A cooking kit comprising, a covered receptacle, a stove having an annular rib surrounding a combustion space and upstanding above the plane of the stove, a fuel receptacle surrounding the combustion chamber and insulated therefrom by material carried beneath the annular rib, and a plurality of utensils proportioned to be contained within the receptacle and each unit bearing upon the unit below with the lowermost of said units bearing upon the annular rib of the stove, and with the cover of the receptacle bearing upon the uppermost unit, whereby each unit is held against movement within the receptacle.

In witness whereof, I have hereunto set my hand and seal at Indianapolis, Indiana, this 9th day of July, A. D. nineteen hundred and nineteen.

OTIS W. NOTTINGHAM. [L. S.]

Witnesses:
E. W. BRADFORD,
M. L. SHULER.